(12) United States Patent
Gooden

(10) Patent No.: US 6,387,315 B1
(45) Date of Patent: May 14, 2002

(54) METHOD FOR MOLDING OBJECTS

(76) Inventor: John K. Gooden, 123 Thompson Dr., Kingfisher, OK (US) 73705

( * ) Notice: Subject to any disclaimer, the term of this patent is extended or adjusted under 35 U.S.C. 154(b) by 0 days.

This patent is subject to a terminal disclaimer.

(21) Appl. No.: 09/427,526

(22) Filed: Oct. 26, 1999

Related U.S. Application Data

(62) Division of application No. 08/988,311, filed on Dec. 10, 1997, now Pat. No. 5,997,274.

(51) Int. Cl.[7] .................... B29C 43/10; B29C 43/56; B29C 35/04
(52) U.S. Cl. .................. 264/500; 264/313; 264/319; 425/405.2
(58) Field of Search .............................. 264/313, 319, 264/335, 553, 371, 500; 422/295, 296; 425/389, 390, 405.1, 405.2

(56) References Cited

U.S. PATENT DOCUMENTS

| | | | | |
|---|---|---|---|---|
| 3,231,947 A | * | 2/1966 | Newton | |
| 3,334,383 A | * | 8/1967 | Irvine | |
| 3,594,877 A | * | 7/1971 | Suda et al. | |
| 3,663,148 A | * | 5/1972 | Walker et al. | |
| 3,986,809 A | * | 10/1976 | Haag | 425/405.1 |
| 4,084,932 A | * | 4/1978 | Morris et al. | 425/405.1 |
| 4,148,597 A | * | 4/1979 | Larsen | 425/389 |
| 4,484,881 A | * | 11/1984 | Asari et al. | 425/405.1 |
| 4,853,170 A | * | 8/1989 | Buhler et al. | 264/517 |
| 4,873,044 A | * | 10/1989 | Epel | 264/257 |
| 5,073,098 A | * | 12/1991 | Mishima | 425/28.1 |
| 5,087,193 A | * | 2/1992 | Herbert, Jr. | 425/543 |
| 5,322,719 A | * | 6/1994 | Westling et al. | 428/34.1 |
| 5,378,134 A | * | 1/1995 | Blot et al. | 425/149 |
| 5,820,894 A | * | 10/1998 | Kreutzer | 425/389 |

* cited by examiner

Primary Examiner—Jan H. Silbaugh
Assistant Examiner—Michael I. Poe
(74) Attorney, Agent, or Firm—Dunlap, Codding & Rogers, P.C.

(57) ABSTRACT

A sculptor's pressure vessel having a frame, a pressure container and an expandable member for pushing the pressure container against a portion of the frame to seal the container. A pressurized gas supply is connected expandable member to inflate it and to push the pressure container against the top of the frame to seal the pressure container. The pressurized gas supply is also connected to the frame top to pressurize the pressure container when it is in sealed contact with the frame.

13 Claims, 3 Drawing Sheets

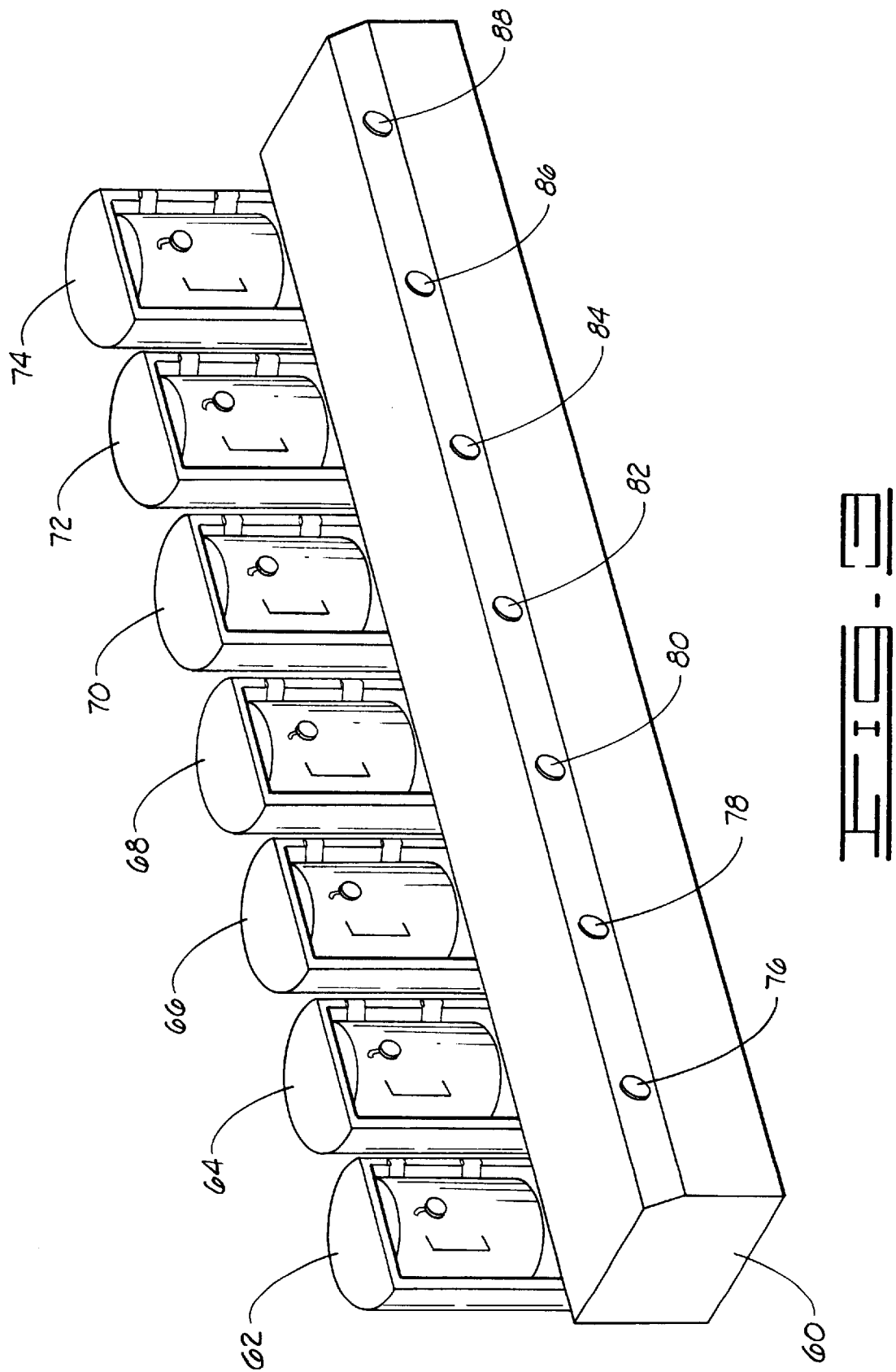

METHOD FOR MOLDING OBJECTS

This application is a division of application Ser. No. 08,988,311, filed Dec. 10, 1997, now U.S. Pat. No. 5,997,274.

FIELD OF THE INVENTION

The present invention relates to pressure vessels such as are used when making a mold of an object.

DESCRIPTION OF THE PRIOR ART

Prior to the current invention when creating objects from molds, one could purchase very expensive molds such as injection molds or vacuum molds, but this also required expensive machinery to use the molds. Such molds are only economically feasible if hundreds or thousands of objects are being made. On the other hand one could use inexpensive molds such as silicon or rubber, but awkward and time consuming paint pots are needed as pressure vessels for the object to start curing in. The use of these awkward pressure vessels require a great deal of time and effort to make a just a few objects. In general, the making of an object with the less expensive molds is done by pouring a soft material into the mold and then placing the full mold into the paint pot. The paint pot is then sealed by tightening several clamps which secure a lid to the paint pot. The pressure in the paint pot is then increased to minimize bubbles which may be in the soft material until the material has hardened. Once the material hardens sufficiently, the pressure in the paint pot is released, the clamps unscrewed, and then mold and its contents can be removed.

One of the major disadvantages of the prior art pressure vessels is that they take a great deal of time to seal up and to pressurize. The most common sizes of paint pots require an operator to manually tighten from six to twelve clamps before pressurizing the vessel. This meant that the material being poured into the mold had a long enough hardening time to allow it to be mixed, poured, the lid to be set in place, all the clamps to be tightened, and the pot to be pressurized. As a practical matter this ruled out mass production since the time required to fill, seal and pressurize a pot requires a material with such a long hardening time.

The prior art pressure pots are not only time-consuming to use but are also inconvenient and require large work areas. Such prior art pots must be located where an operator can reach all the sealing clamps, which usually means they are placed at floor level where the operator can bend over and reach the clamps. In addition, the operator must lift the heavy lid off the pot and set it somewhere, thus placing additional strength requirements on the operator as well as requiring space for the lid to be placed.

SUMMARY OF THE INVENTION

In view of the foregoing disadvantages inherent in the known types of pressure vessels now present in the prior art, the present invention provides an improved pressure vessel construction wherein the same can be utilized reliably in those situations where speed, safety and ease of use are desired. As such, the general purpose of the present invention, which will be described subsequently in greater detail, is to provide a new and improved pressure vessel which has all the advantages of the prior art pressure vessel devices and none of the disadvantages.

To attain this, the present invention essentially comprises a pressurizable container having an opening therein through which items may pass to be placed inside the container. The container may be placed in a frame where an expandable member between the frame and the container can be expanded to cause the container to come in sealable contact with a lid. The container may be hingidly attached to the frame to facilitate the insertion and removal of the container from the frame. In addition, the expandable member and a conduit used to pressurize the container after it is sealed may be connected through valves to a common source of pressurization. In this way a single valve may be used to seal the container and then to pressurize the container's interior.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pressure vessel which may be easily and efficiently manufactured and marketed.

It is a further object of the present invention to provide a new and improved pressure vessel which is of a durable and reliable construction.

An even further object of the present invention is to provide a new and improved pressure vessel inexpensive to make, thus making such pressure vessel economically available to the buying public.

Still another object of the present invention is to provide a new and improved pressure vessel which provides some of the advantages of the prior art, while simultaneously overcoming some of the disadvantages normally associated therewith.

Another object of the present invention is to provide a new and improved pressure vessel which provides increased efficiency in respect to both time and space required for use.

Yet another object of the present invention is to provide a new and improved pressure vessel which is safer to use than prior art pressure vessels.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of a plurality of pressure vessels constructed in accordance with the invention and mounted on a bench.

DETAILED DESCRIPTION OF THE PREFERRED EMBODIMENTS

Figure 1:
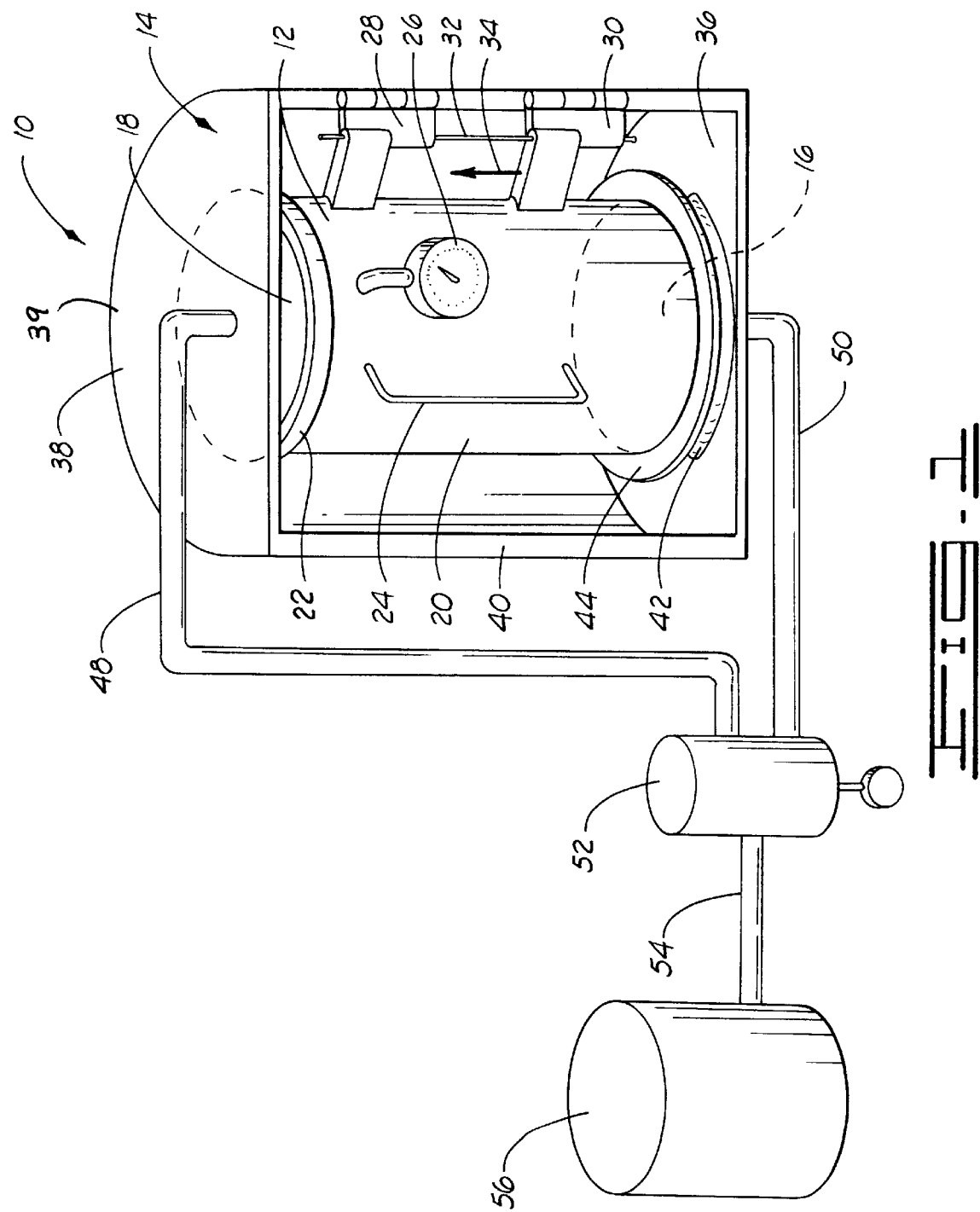
FIG. 1 is a front view of a pressure vessel constructed in accordance with the present invention and having the pressure container in its frame.
Figure 2:
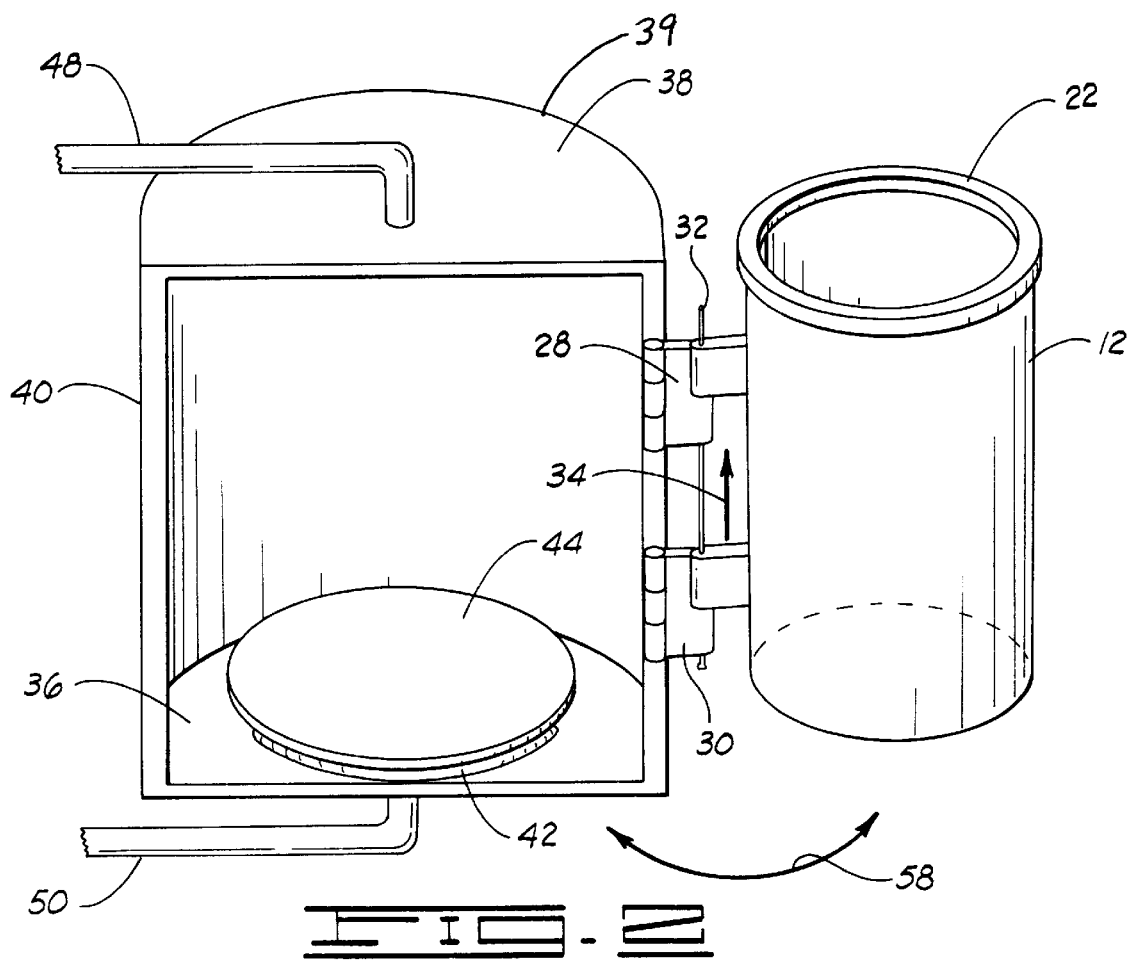
FIG. 2 is a front view of the pressure vessel of FIG. 1 and having the pressure container swung out of its frame.

Referring to the drawings in detail and to FIGS. 1 and 2 in particular, reference character 10 generally designates a sculptor's pressure vessel apparatus constructed in accordance with the present invention, and reference character 12 designates a pressure container hingibly mounted on a frame 14.

The pressure container 12 may be virtually any shape which will allow for items to be placed inside; however, in the preferred embodiment the pressure container 12 is a hollow cylinder having an integral bottom 16 (shown in phantom) and an opening 18 at the top. The pressure container 12 may be made from any material which will withstand an increased internal pressure within the container 12. One suitable material is steel; and more preferably, a section of steel pipe may be used to make the walls 20 of the container 12. A steel plate may then be welded to make the bottom 16.

The top of the pressure container 12 is open and may include a gasket 22 to aid with sealing the pressure container when it is in position for pressurization. One suitable gasket material is rubber. As is shown in the drawings, the gasket material may be attached to the pressure container, but it should be understood that as an alternative the gasket material may be attached to the lid used to close the container 12.

In the preferred embodiment the pressure container includes a handle 24, and a pressure gauge 26. The handle 24 makes it easier to move the pressure container into and out of the frame 14, and the pressure gauge 26 allows the operator to see the internal pressure in the pressure container.

The pressure container 12 may be an independent part of the pressure vessel apparatus 10, so long as the pressure container 12 may be placed in the frame 14 and removed therefrom. However, preferably the pressure container in 12 is hingably attached to the frame 14 by hinges, such as hinges 28 and 30. In this way, the pressure container 12 can simply swing into or out of the frame 14 (see FIG. 2 arrow 58). It has been found that a pair of double hinges 28 and 30, wherein there is a hinge point at or near the frame 14 and between the frame 14 and the pressure container 12, allows for easy placement of the pressure container 12 in the frame 14, as well as allowing the pressure container 12 to extend sufficiently from the frame 14 to allow easy access to the interior of the pressure container 12.

In the most preferred embodiment, the hinges 28 and 30 are designed to allow the pressure container 12 to move up as is indicated by arrow 34. As will be explained in detail below, this will allow the pressure container to be hingedly mounted to the frame and still allow it to move into sealed contact with a lid.

The frame includes a bottom 36, a top 38 and at least one side member 40. The bottom, top and the at least one side member are securely joined together to hold the top a fixed distance from the bottom. This may be accomplished by using a durable material such as steel and welding both the bottom 36 and the top 38 to the at least one side member 40. There may be more than one side member if desired so long as the top and the bottom are securely held in place. One suitable way to make the frame is to use a section of pipe which has a considerably larger diameter than the pressure container 12 and cut it in half longitudinally. This will provide a side member which will enclose the pressure container effectively on three sides. If a deeper cavity is desired to house the pressure container 12 when it is in place for pressurization, the top and bottom may be extended beyond the pipe side member 40 and additional supports may be added to stabilize the top 38 and the bottom 36.

Preferably expandable means 42 is provided for pushing against the frame 14 and for pushing a lid and the pressure container together when the expandable means is expanded. As shown in FIG. 1, the top 38 may also be the lid. Of course an additional piece may be attached to the top 38 to serve as a lid, but it has been found that economy of construction indicates that the top and the lid should be one and the same. This also allows for a conduit to pass through the lid as will be explained further below. While the expandable means may be pneumatically or hydraulically operated, such as by a hydraulic or pneumatic cylinder, one suitable means is an air spring 42, such as are used on the suspension of large trucks. An air spring may be placed on the bottom 36 such that the pressure container 12 may sit on or just above it when in position for pressurization. When the air spring 42 is expanded by pressurization, it will push the pressure container 12 up into contact with the lid 38. An additional plate 44 may be placed on top of the air spring 42 to provide durability and uniform pressure against the pressure container 12. It should be noted, as mentioned before, the lid 38 may be a separate piece and the expandable means could then be placed between the frame top and the lid. However, it has been found that using an integral top 38 with the air spring 42 sitting on the frame bottom 36 is preferred.

To enhance the seal between the pressure container 12 and the lid 38, a gasket 22 may be used. Preferably the gasket material is pliable to conform to any irregularities in either the pressure container or the lid. One effective and simple gasket may be made by placing a rubber cap on the pressure container 12 and then cutting a portion of the cap center away to leave the opening 18 in the top of the pressure container 12 open for access. In this way, rubber material is positioned around the upper edge of the pressure container 12 to provide the desired seal.

In the preferred embodiment, where the lid 38 is an integral part of the frame top 39, a conduit 48 is connected to the lid and passes therethrough. In this way, when the pressure container 12 is in sealed contact with the lid, gas may pass through the lid 38 into the pressure container and thereby pressurize the interior of the pressure container. The conduit 48 extends from the frame to a valve 52 which is used to selectively allow pressure to enter the pressure container. A conduit 54 supplies the pressurized gas from a supply tank 56, such as is used with a conventional air compressor.

Another conduit 50 extends from the valve 52 to the air spring 42. This conduit provides the pressure to expand the air spring 42 and lift the pressure container 12 into sealed contact with the lid 38.

Referring now to FIG. 3, the most preferred embodiment of the invention provides a plurality of pressure vessels (such as pressure vessels 62, 64, 66, 68, 70, 72 and 74) mounted on a work bench 60. While groups of pressure vessels may be operated from a single valve, preferably each pressure vessel has a separate valve (such as valves 76, 78, 80, 82, 84, 86 and 88) to control its air spring and pressurization. With this arrangement, a quick-setting material, such as a quick-setting urethane resin, may be used with the molds even though several pressure vessels are needed for the run since each pressure container may be quickly loaded and sealed. In addition, this arrangement allows the operator to work at a comfortable height further increasing speed, safety and efficiency. In contrast, if conventional pressure pots were used, the pots are usually set lower so the operator may reach the multiple clamps needed to seal the pot. Such a conventional arrangement requires more space, is considerably slower, and increases back strain on the operator.

Various types of valving may be suitably used to control the pressurization and the expansion of the air spring(s), including using a separate valve for the air spring and the pressurization. Another alternative is a single two-position valve which may be used to simultaneously expand the air spring and supply pressure to the pressure container in the first position. The second position bleeds pressure from both the air spring and the pressure container. However, the preferred valve 52 has three positions, one to supply pressure to the air spring 42, one to supply pressure to the pressure container 12 and the final position to bleed pressure from both the air spring 42 and the pressure container 12.

Figure 4:
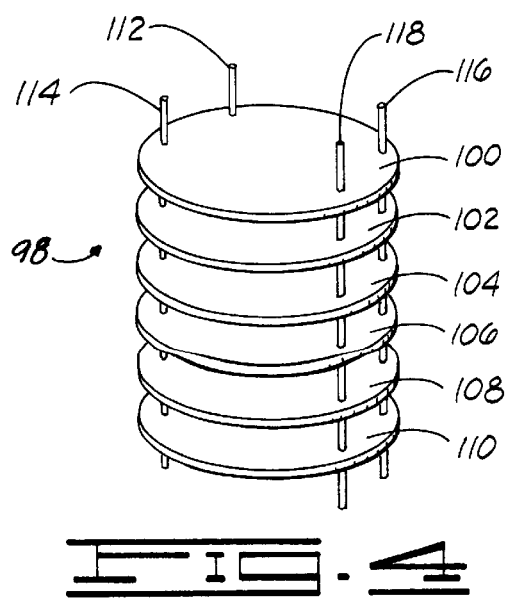
FIG. 4 is a perspective view of a rack for placing molds into the pressure vessel of FIG. 1.

As shown in FIG. 4, a rack 98 may be used to allow several molds to be placed in each pressure vessel. The rack includes a plurality of shelves 100, 102, 104, 106, 108 and 110. A fewer, or greater number of shelves, may be used depending on the size of the molds and the pressure container. The shelves are supported and separated by rods 112, 114, 116 and 118. A fewer number of rods, such as three, may be used or a larger number of rods may be used. However, as the number of rods is increased, the room left between rods for placing a mold on a shelf is decreased.

In operation, a batch of hardening material is mixed and then poured into one or more molds. The molds are placed in one or more pressure vessels, and the pressure containers are swung into their respective frames. The valve for that pressure is activated to push the pressure container up into sealed contact with the lid. The valve is then positioned to pressurize the pressure container. After sufficient time has passed to allow the hardening material to sufficiently stiffen, the pressure is then released from both the air spring and the pressure container, and the molds are removed.

Changes may be made in the combinations, operations and arrangements of the various parts and elements described herein without departing from the spirit and scope of the invention as defined in the following claims.

I claim:

1. A method for molding objects comprising the steps of:

placing a mold containing material to be hardened in a pressure container having an inside, an outside, an opening therein to allow items to be placed in or removed from the pressure container, and a bottom, wherein the container is hingedly connected to a frame having a bottom, a top and at least one side member for housing the pressure container, to allow the pressure container to swing out of the frame to a loading position and into the frame to a housed position;

closing a lid, said lid connected to said frame and being sized and adapted for covering the pressure container opening to isolate an internal pressure inside the pressure container;

inflating an expandable means inside said frame between the frame and the lid or between the frame and the bottom of the pressure container when said pressure container is in the housed position for pushing against the frame and the lid or against the frame and the bottom of the pressure container to push the lid and the opening in the pressure container together when the expandable means is expanded to seal the lid against the pressure container, wherein the lid and pressure container are pushed together by pushing the lid or the pressure container away from the frame; and inserting gas into the pressure container to thereby raise the internal pressure in the pressure container.

2. The method of claim 1 wherein said at least one side member is connected to both the bottom of the frame and to the top of the frame, and wherein the lid is an integral part of the top of the frame.

3. The method of claim 1 wherein the expandable means is hydraulically expanded.

4. The method of claim 1 wherein the pressure container is a hollow cylinder having opposite ends, one end being capped and the other end being open.

5. The method of claim 1 wherein the expandable means is pneumatically expanded.

6. The method of claim 5 wherein the expandable means is an expandable air spring.

7. The method of claim 5 wherein said at least one side member is connected to both the bottom of the frame and to the top of the frame to hold the bottom of the frame and the top of the frame a fixed distance apart, said lid is integral with the top of the frame, and wherein the pressure container is housed inside the frame when pressurized.

8. The method of claim 7, wherein the expandable means is an air spring.

9. A method for holding one or more flexible molds in a pressurized environment while a soft material in the one or more molds begins to harden, comprising:

placing one or more flexible molds in a pressure vessel having; a frame having a bottom, a top and at least one side member, said at least one side member being connected to both the bottom of the frame and to the top of the frame to hold the bottom of the frame a fixed distance from the top of the frame; a lid being integral with said frame top; a pressure container having an inside, an outside, an opening therein to allow items to be placed in or removed from the pressure container, and a bottom, said pressure container being hingedly connected to said at least one side member to allow the pressure container to swing out of said frame to a loading position or into said frame to a housed position; an expandable member inside said frame between said frame bottom and said pressure container when said pressure container is in the housed position for pushing against said frame and said bottom of said pressure container to push the pressure container away from the frame bottom and to push the opening in the pressure container and said lid together to seal the pressure container when the expandable member is expanded; a conduit connecting a source of pressurized gas and the lid; and a valve in said conduit for selectably increasing an internal pressure in the pressure container when the pressure container is sealed against said lid;

sealing said pressure container against said lid; and opening said conduit to insert gas into the pressure container.

10. The method of claim 9, wherein the expandable member is an air spring.

11. The method of claim 9, wherein the pressure vessel further comprises: one or more double hinges connected to the frame and to the pressure container.

12. The method of claim 11 wherein the pressure vessel further comprises: a handle connected to the pressure vessel to make it easier for an operator to move the pressure container in and out of the frame.

13. The method of claim 12 wherein the pressure vessel further comprises: a pressure gauge to allow the operator to determine the internal pressure in the pressure container.

* * * * *